(12) United States Patent  
Chen

(10) Patent No.: US 7,448,979 B2  
(45) Date of Patent: Nov. 11, 2008

(54) BICYCLE HUB SPEED-CHANGE ASSEMBLY

(75) Inventor: Chun-Hsung Chen, Taichung County (TW)

(73) Assignee: Joy Industrial Co., Ltd., Daya Township, Taichung County (TW)

( * ) Notice: Subject to any disclaimer, the term of this patent is extended or adjusted under 35 U.S.C. 154(b) by 352 days.

(21) Appl. No.: 11/448,043

(22) Filed: Jun. 7, 2006

(65) Prior Publication Data

US 2007/0287574 A1 Dec. 13, 2007

(51) Int. Cl.
*F16H 3/44* (2006.01)

(52) U.S. Cl. .................................. 475/297

(58) Field of Classification Search ............. 475/269, 475/296, 297; 180/342, 343, 356, 369
See application file for complete search history.

(56) References Cited

U.S. PATENT DOCUMENTS 2,816,634 A * 12/1957 Brown .................. 192/217.4
2,844,050 A *  7/1958 Brendel .................. 192/64
3,186,259 A *  6/1965 La Brie ................... 475/294
5,964,679 A * 10/1999 Matsuo et al. ............ 475/297
6,468,178 B1* 10/2002 Mohtasham .............. 475/277
6,607,465 B1*  8/2003 Shoge .................... 475/297

* cited by examiner

*Primary Examiner*—Roger Pang
(74) *Attorney, Agent, or Firm*—Muncy, Geissler, Olds & Lowe, PLLC

(57) ABSTRACT

The present invention discloses a bicycle hub speed-change assembly having a planetary gear set disposed therein, a speed-change gear wheel separately disposed on both left and right sides of the planetary gear set, and a first ratchet jacket and a second ratchet jacket respectively disposed on the external side of the speed-change gear wheels, such that control ratchets of the first ratchet jacket and second ratchet jacket are selectively hidden or driven by an external ring of the planetary gear set to couple the first ratchet jacket with a hub, so as to provide three different speeds and the invention features the advantages of stable speed, simplified components, and light weight.

5 Claims, 7 Drawing Sheets

BICYCLE HUB SPEED-CHANGE ASSEMBLY

FIELD OF THE INVENTION

The present invention relates to a bicycle hub, and more particularly to a built-in three-speed hub having the features of a simple structure, an easy manufacture and a stable speed change.

BACKGROUND OF THE INVENTION

Referring to FIGS. 1 and 2 for the exploded view and the cross-sectional view of a traditional built-in three-speed hub respectively, the traditional hub includes an axle shaft 1, a hollow planetary gear set 2 passing through and connecting the middle of the axle shaft 1, a clutch 3 having a plurality of teeth disposed at an end of the clutch 3 for engaging an interior of a driving member 4, an external ring 5 disposed at the external periphery of the planetary gear set 2 and having two corresponding ratchets 5b, a hub 7 having a plurality of internal teeth 8 disposed on a sidewall of the hub 7, and a driving member 4 having its external periphery engaged with a bicycle sprocket 9, such that if the sprocket 9 drives the driving member 4 to rotate, the clutch 3 situated at the driving member 4 will be driven by the clutch 3, and a ring gear 3a in the clutch 3 will be latched with the internal teeth of the planetary gear set 2 for driving the planetary gear set 2 to rotate, and four planetary gear wheels 2a drive the external ring 5 to rotate, and two protruded teeth 5a of the external ring 5 are engaged with the internal teeth 8 disposed at a side of the hub 7 to rotate the hub 7. If the clutch 3 is withdrawn and separated from the planetary gear set 2, an end of each ratchet 5b of the external ring 5 will be pushed outward, so that another embedding end at the external side is hidden and will not drive the hub 7 to rotate, and a plurality of wheel teeth 4a of the driving member 4 are engaged with the protruded teeth 5a of the external ring 5 for driving the external ring 5 to rotate, and four planetary gear sets 2 in the external ring 5 can be rotated, and the embedding teeth 2b can be engaged with the internal teeth 8 at the other side of the hub 7, so that the hub 7 can be rotated. The movement of the clutch 3 is controlled by the displacement of a gear lever 1a in the axle shaft 1. When the slope of a skewed groove 1b of the axle shaft 1 guides the ring gear 3a at the internal side of the clutch 3 for a connection, the ring gear 3a is guided slantingly into the skewed groove 1b during a rotation, so that the driving member 4 can drive the external ring 5. When the gear lever 1a is pushed inward again, the clutch 3 pushes the planetary gear set 2, and the embedding teeth 2b are engaged with the internal teeth 8 of the hub 7 to drive the hub 7 to rotate.

Since the foregoing internal teeth 8 disposed on both sides of a traditional hub 7 are in the hub 7, the process for manufacturing the teeth is not easy, and the skewed groove 1b of the axle shaft 1 is in a spiral shape which makes the manufacturing process more difficult. Further, the prior art speed-change hub consists many complicated components, and thus causing a heavy total weight and incurring a high manufacturing cost.

SUMMARY OF THE INVENTION

The primary objective of the present invention is to provide a hub speed-change assembly having a structural design for achieving a stable speed change, an easy manufacture, and a simple structure of components to reduce the manufacturing cost.

DETAILED DESCRIPTION OF THE PREFERRED EMBODIMENTS

Figure 1:
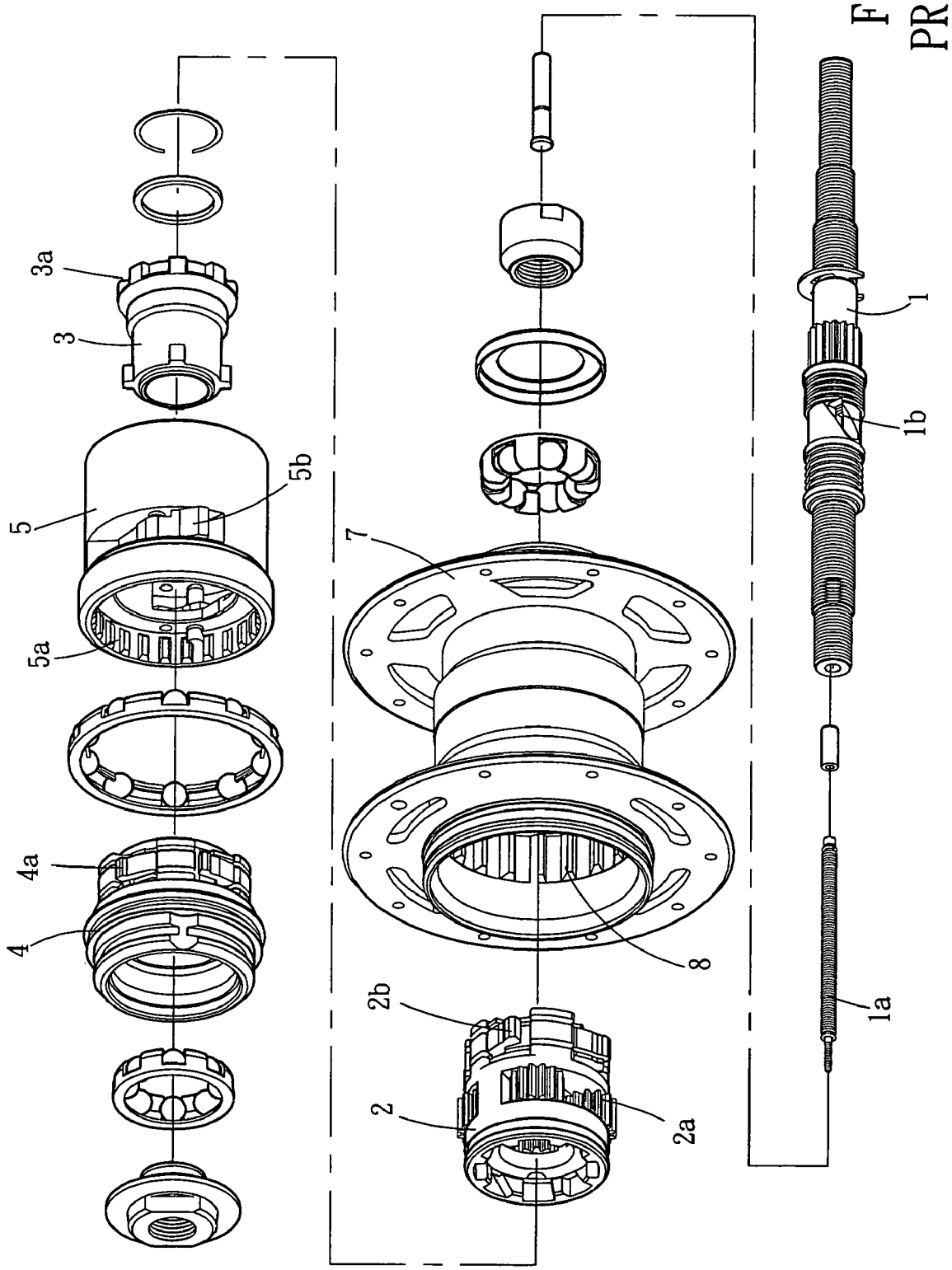
FIG. 1 is an exploded view of a traditional built-in three-speed hub.
Figure 2:
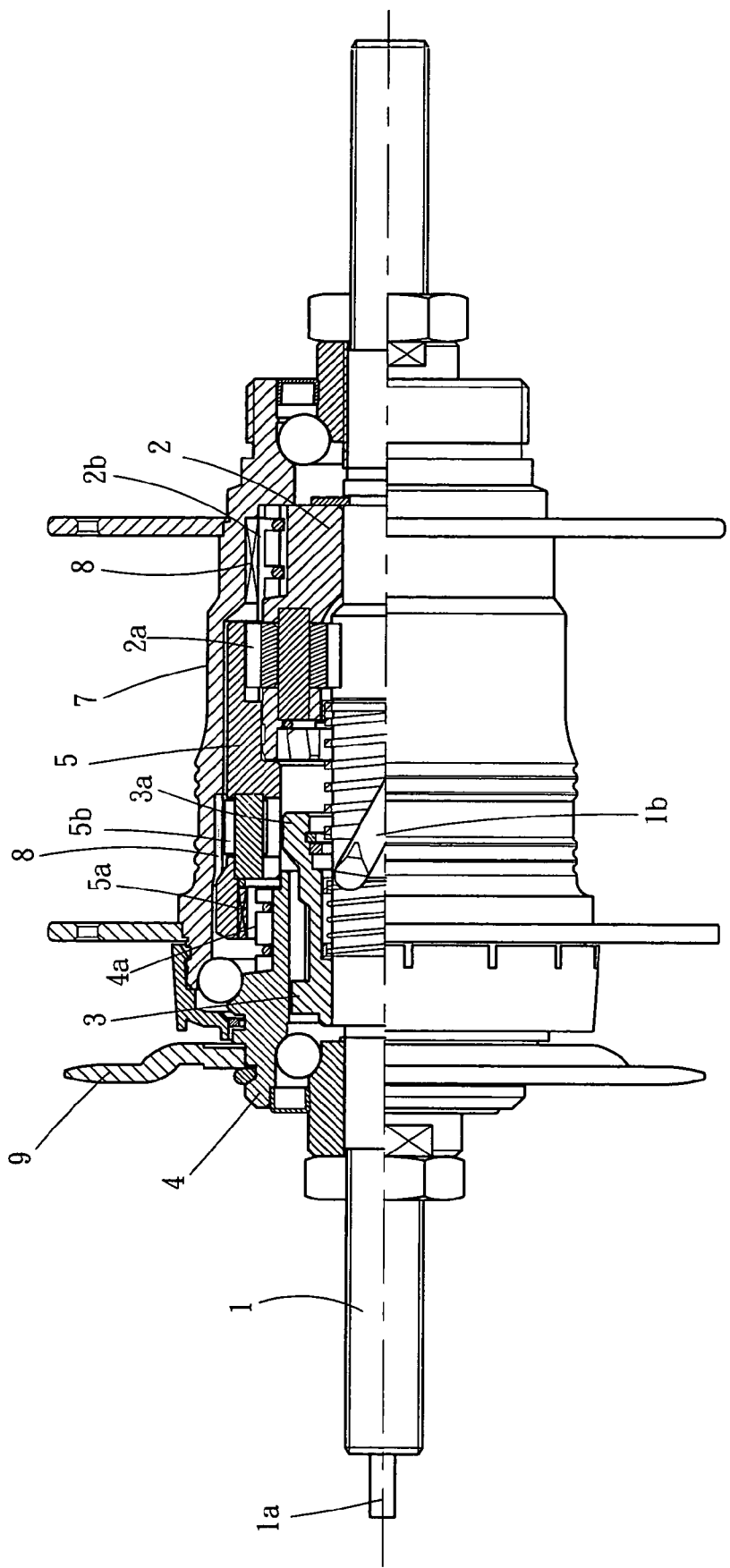
FIG. 2 is a cross-sectional view of a traditional built-in three-speed hub assembly.
Figure 3:
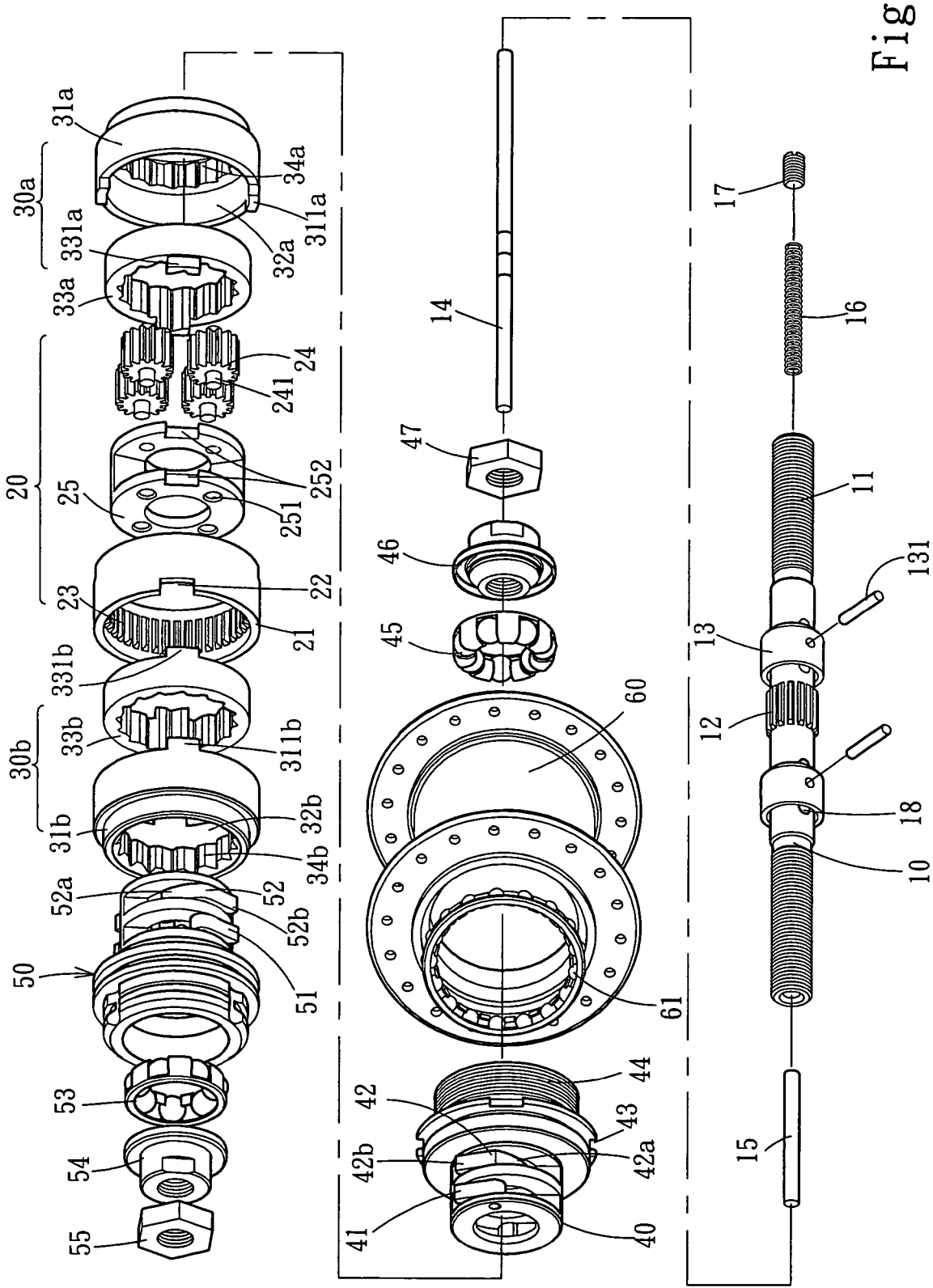
FIG. 3 is an exploded view of a preferred embodiment of the present invention.
Figure 4:
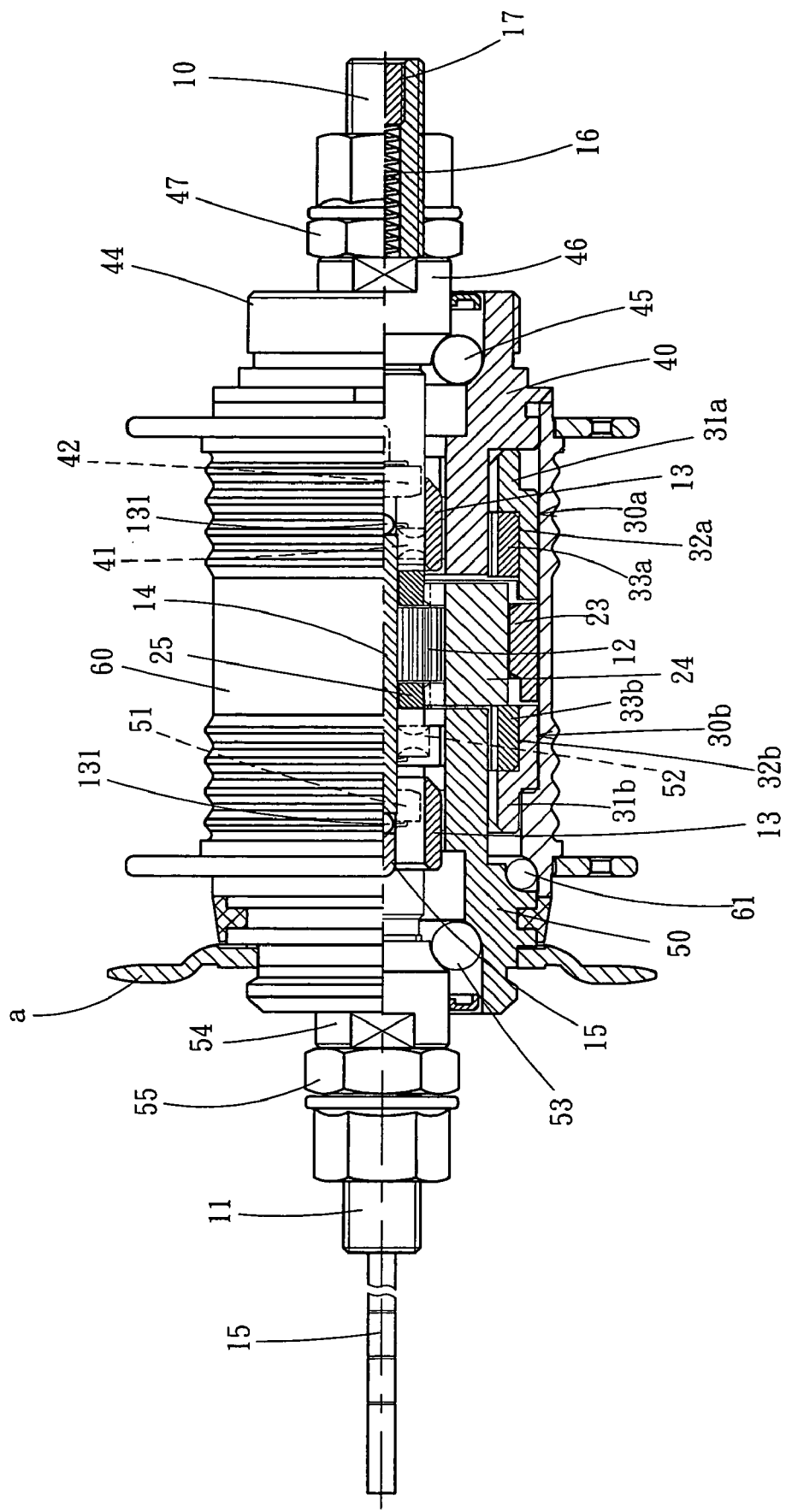
FIG. 4 is a cross-sectional view of the preferred embodiment of the present invention.
Figure 5:
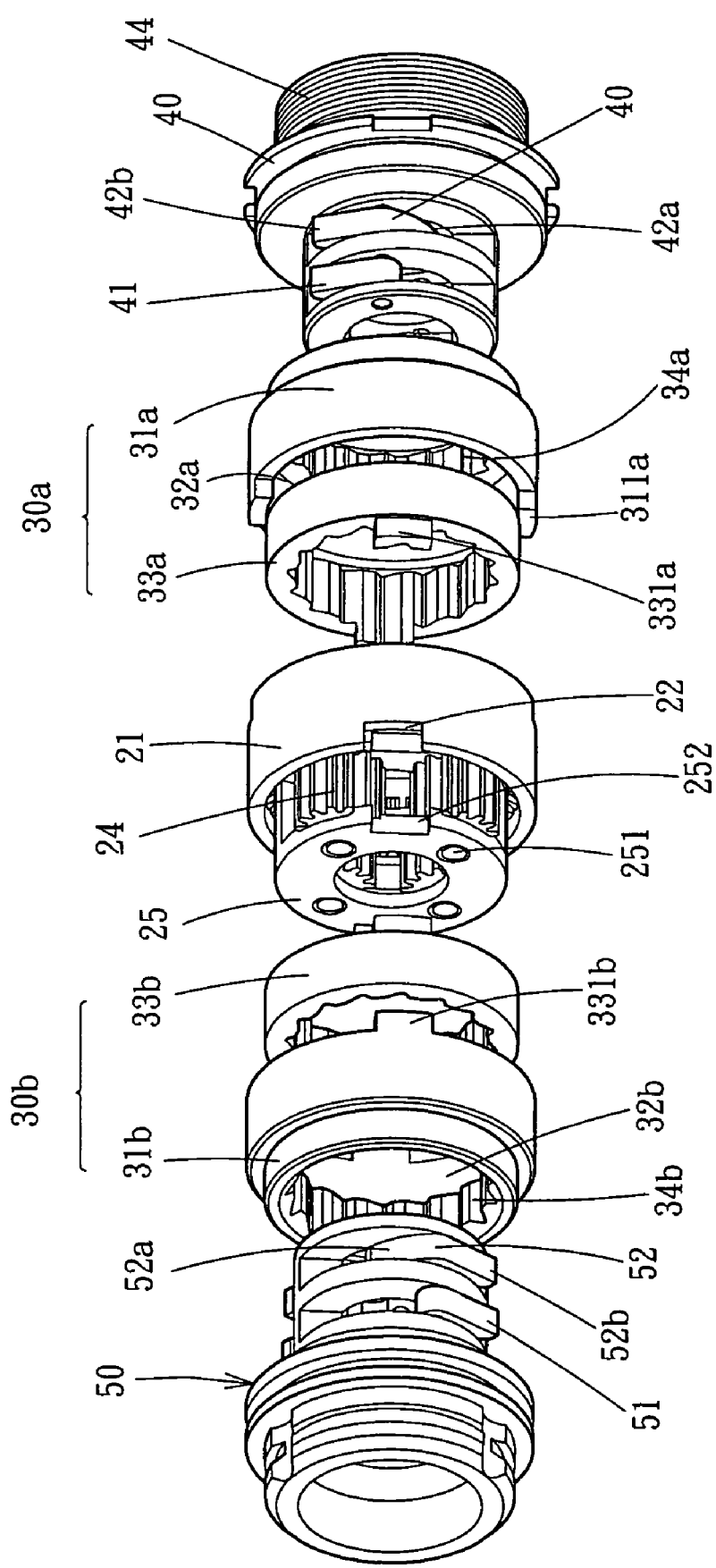
FIG. 5 is a perspective view of the preferred embodiment of the present invention.

Referring to FIGS. 3 to 5 for a bicycle hub speed-change assembly of the present invention, the bicycle hub speed-change assembly comprises a hollow axle shaft 10, a screw rod 11 disposed separately on both left and right sides of the hollow axle shaft 10, a gear wheel 12 disposed at the middle portion of the hollow axle shaft 10, a bushing 13 disposed separately on both left and right sides of the gear wheel 12, a fixing pin 131 for radially connecting the surrounding walls of the bushing 13 and passing through a long groove 18 of the axle shaft 10, a gear lever 14 of passing through a lateral side of the interior of the axle shaft 10, a gear shift guiding rod 15 disposed between two fixing pins 131 and passing and connecting the interior of the axle shaft 10, and an end of the axle shaft 10 is sheathed into a spring 16 and locked by a screw bolt 17, and the gear lever 14 is passed and connected to another side of the axle shaft 10.

A planetary gear set 20 comprises a hollow external ring 21, a pair of notches 22 disposed at corresponding positions of two sidewalls of the external ring 21, and a plurality of internal teeth 23 disposed on the internal wall of the external ring 21, and four planetary gear wheels 24 are engaged with the internal teeth 23 to produce revolutions, and each planetary gear wheels 24 includes an insert rod 241 disposed on both left and right sides of each planetary gear wheel 24 for connecting an insert hole 251 on both left and right sides of a gear carrier 25, such that each planetary gear wheels 24 is exposed from a window hole around the surrounding surface of the gear carrier 25 and engaged with the internal teeth 23 of the external ring 21, and the gear carrier 25 includes two corresponding notches 252 disposed on the left and right sidewalls of the gear carrier 25.

Two speed-change gear wheels 30a, 30b are hollow and disposed on the left and right sides of the planetary gear set 20, and each speed-change gear wheel 30a, 30b includes an external ring gear 31a, 31b, and each external ring gear 31a, 31b has two corresponding embedding portions 311a, 311b protruded from the radial surface of the planetary gear set 20 and a chamber 32a, 32b disposed therein for separately containing the two internal ring gears 33a, 33b, and each internal ring gear 33a, 33b has two engaging portions 331a, 331b protruded from the corresponding positions at the external sides of the internal ring gear 33a, 33b, and each chamber 32a, 32b includes a plurality of ring gears 34a, 34b disposed around the lateral sidewall of the chamber 32a, 32b.

A first ratchet jacket 40 is a hollow member disposed at an external side of the speed-change gear wheel 30a, a pair of resilient ratchets 41 pivotally coupled to a lateral sidewall, and a pair of control ratchets 42 disposed at a middle section. The control ratchets 42 are in the shape of a hook having an end as a control end 42a that can move freely on the walls of the ratchet jacket 40 and another end exposed to the outside as a driving end 42b for engaging an internal ring gear 33a of the speed-change gear wheel 30a. The first ratchet jacket 40 comprises an indent tooth 43 disposed at each of the four corners of the external periphery, a screw thread 44 disposed on an external side of the first ratchet jacket 40, and a first bearing 45 coupled to an opening at the external side of the first ratchet jacket 40 and a first cover 46 secured onto a screw rod 11 at the right side of the axle shaft 10, such that the first bearing 45 is installed between the exterior of the first cover 46 and the internal wall of the first ratchet jacket 40, and a first screw nut 47 locked with the axle shaft 10 and disposed on the external side of the first cover 46.

A second ratchet jacket 50 is a hollow member comprising a resilient ratchet 51 disposed at the middle section of the second ratchet jacket 50 and can be pressed and withdrawn flexibly, a pair of control ratchets 52 disposed on a lateral sidewall of the resilient ratchet 51, and the control ratchets 52 are substantially in the shape of a hook having an end as a control end 52a disposed in the hollow interior of the second ratchet jacket 50 and another end being disposed at an external side and serving as a driving end 52b and the second ratchet jacket 50 is coupled to a bicycle chain tooth a, a second bearing 53 coupled to an opening at the external side of the second ratchet jacket 50, and a second cover 54 screwed to another side of the axle shaft 10, and the second bearing 53 is installed between the second ratchet jacket 50 and the second cover 54 and locked with the axle shaft 10 by a second screw nut 55 to fix the second cover 54.

A hub 60 is a hollow cylindrical body comprising an interior connected to the axle shaft 10, a planetary gear set 20, two speed-change gear wheels 30, a first ratchet jacket 40, a second ratchet jacket 50, and a third bearing 61 installed between the internal walls of the first ratchet jacket 40 and the hub 60.

During a first level speed change of the foregoing structure, the chain tooth a directly drives the second ratchet jacket 50 to rotate. The resilient ratchets 51 of the second ratchet jacket 50 and the driving ratchets 52 are engaged with the external ring gear 31b and the internal ring gear 33b respectively to drive the external ring gear 31b and the internal ring gear 33b to rotate, and the external ring gear 31b can be inserted into the notches 22 of the external ring 21 by its embedding portion 311b to drive the external ring 21 of the planetary gear set 20 to rotate. The internal ring gear 33b is connected to the notches 252 of the gear carrier 25 by its engaging portion 331 and planetary gear set 20 to drive the gear carrier 25 and the four planetary gear wheels 24 to rotate. Since the internal ring gear 33b drives the gear carrier 25 to rotate by means of rotating the four planetary gear wheels 24 to drive the external ring 21, the rotation of the external ring 21 is accelerated, and the external ring 21 drives the external ring gear 31b to accelerate its rotation and forces the resilient ratchets 51 of the second ratchet jacket 50 to slide without being exerted by an external force.

Since the engaging portion 331a of the internal ring gear 33a is inserted into the notch 252 on another side of the gear carrier 25, therefore the internal ring gear 33a can be rotated as well. The two embedding portions 311a of the external ring gear 31a are embedded into the two notches 22 at another side of the external ring 21 and driven to rotate. The rotary speed of the external ring 21 is faster than the speed of the gear carrier 25, such that the speed of the external ring gear 31a is faster than the speed of the internal ring gear 33a, so as to drive the control ratchets 42 of the first ratchet jacket 40 to move. The gear carrier 25 drives the internal ring gear 33a to rotate slower, but the resilient ratchets 41 and the control ratchets 42 are rotated synchronously and situated at a sliding status of the resilient ratchets 41, and the first ratchet jacket 40 is coupled to the hub 60, so that the hub 60 rotates with the first ratchet jacket 40 to drive the bicycle forward. In this first level speed, the second ratchet jacket 50 rotates one round while the first ratchet jacket 40 is rotating 1.35 rounds.

Figure 6:
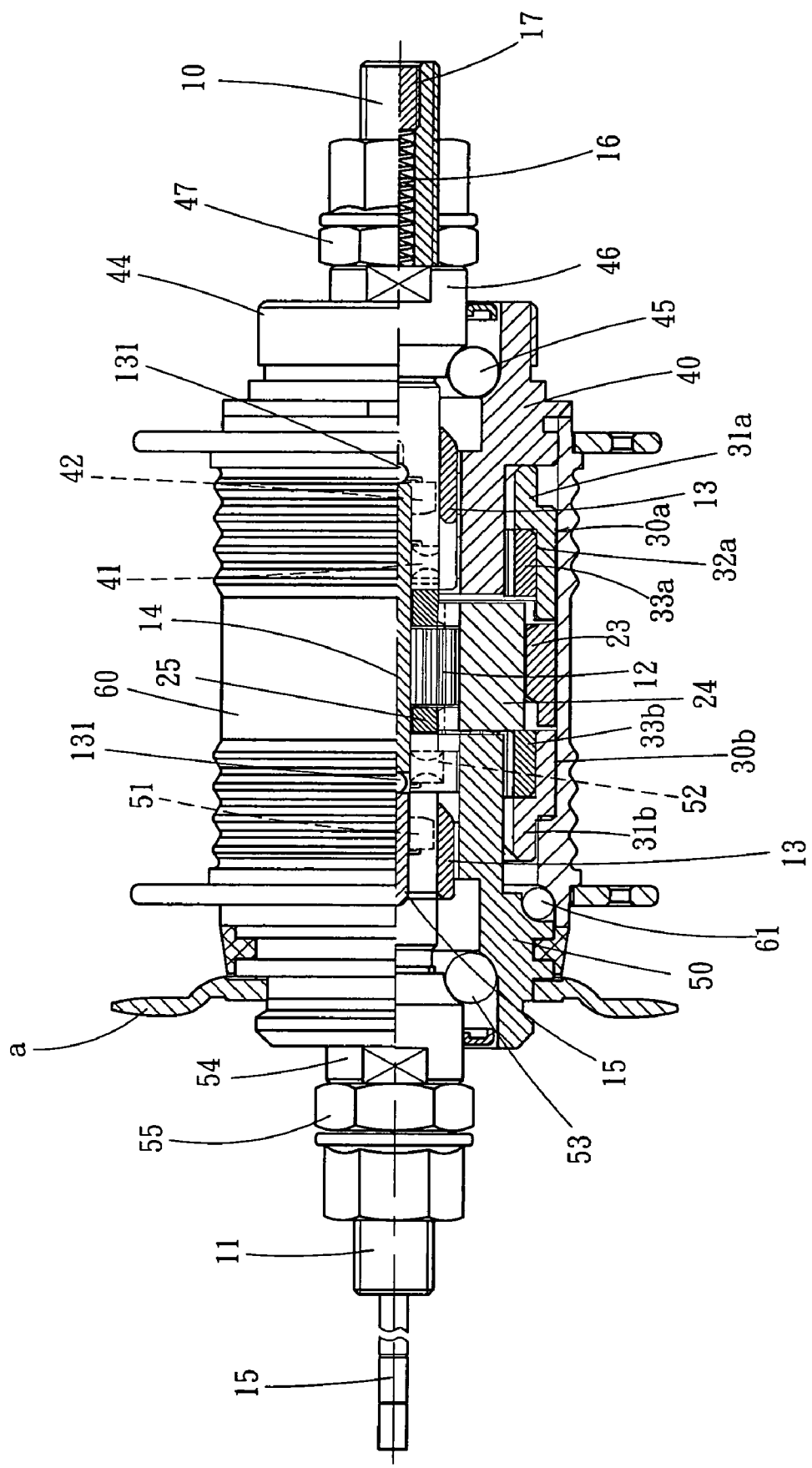
FIG. 6 is a schematic view of the two-speed movements of the preferred embodiment of the present invention.

Referring to FIG. 6 for a second level of speed change, a gear lever 14 is pulled and a gear shift guiding rod 15 is driven by the tension of the spring 16 to move the fixing pin 131, and the fixing pin 131 is pushed to the right side of the bushing 13 to prop the external wall of the bushing 13 against the control end 42a of the control ratchets 42 of the first ratchet jacket 40 outward, and the driving end 42b is withdrawn inward, such that when the chain tooth a drives the second ratchet jacket 50 to rotate and its resilient ratchets 51 can drive the external ring gear 31b to revolve and the control ratchets 52 drives the internal ring gear 33b to rotate. The external ring gear 31b and the internal ring gear 33 drive the external ring 21 and the gear carrier 25 to rotate. Since the internal ring gear 33b drives the gear carrier 25 to rotate and transmits the four planetary gear wheels 24, the speed of the external ring 21 is accelerated, and the external ring 21 is driven in a reverse direction to drive and accelerate the external ring gear 31b, so that the resilient ratchets 51 are slid without being exerted by an external force. In the meantime, the external ring 21 drives the external ring gear 31a to rotate at a speed faster than the speed of the internal ring gear 33a driven by the gear carrier 25, such that the external ring gear 31a is moved first (exerted by a force). However, the driving end 42b of the control ratchets 42 is hidden inward, so that the external ring gear 31a is run idly, and the gear carrier 25 drives the internal ring gear 33a to revolve and drive the first ratchet jacket 40 to rotate, and the hub 60 will rotate according to the first ratchet jacket 40. In this second level of speed, the second ratchet jacket 50 rotates one round while the first ratchet jacket 40 is rotating one round.

Figure 7:
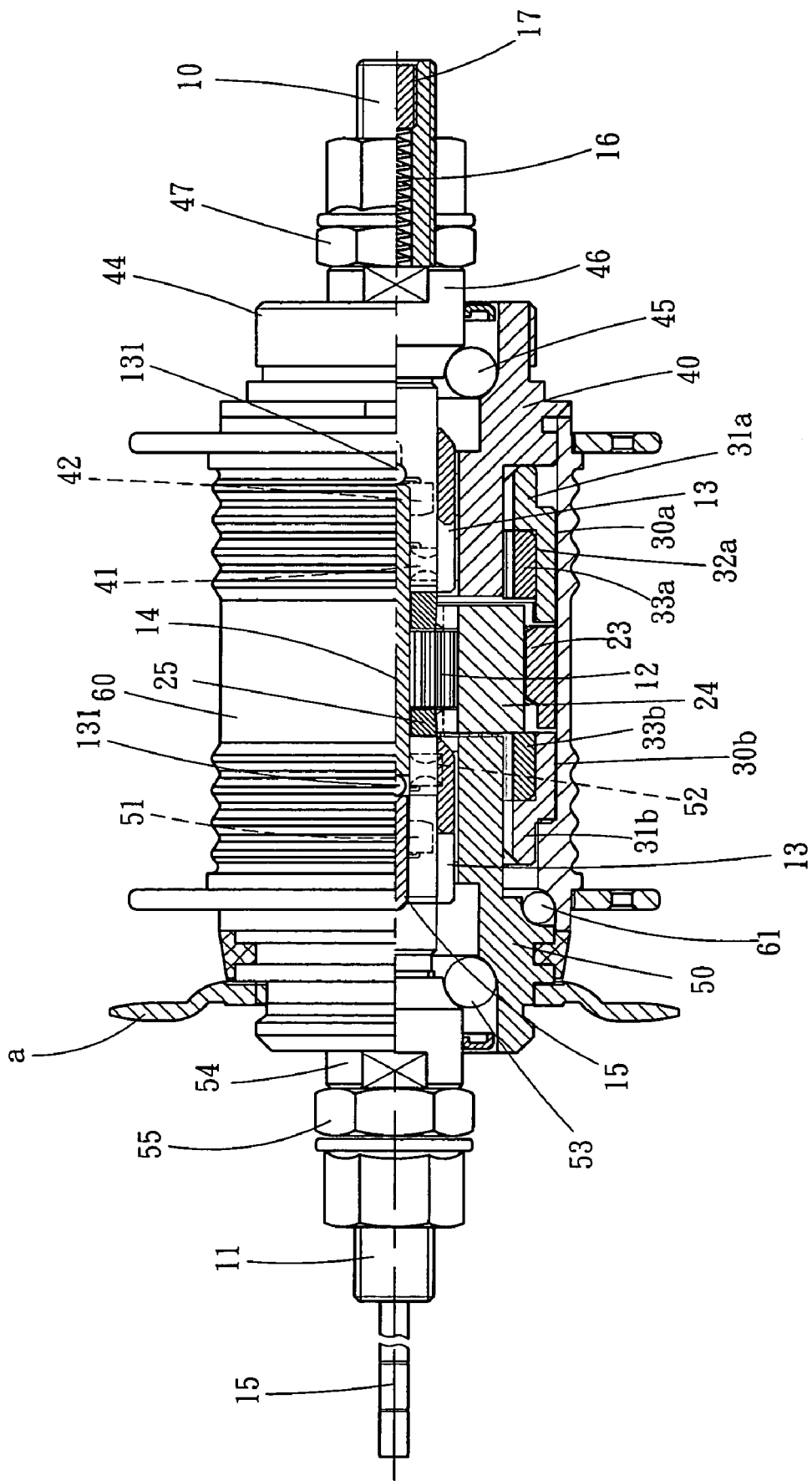
FIG. 7 is a schematic view of the three-speed movements of the preferred embodiment of the present invention.

Referring to FIG. 7 for the third level of speed change, the gear lever 14 is operated, such that the two fixing pins 131 drive the two bushings 13 to displace respectively, and each bushing 13 can push the control end 42a of the control ratchets 42 of the first ratchet jacket 40 outward, such that the driving end 42b is withdrawn inward, and push the control end 42a of the control ratchets 52 of the second ratchet jacket 50 outward, such that the driving end 52b is withdrawn inward. If the chain tooth a drives the second ratchet jacket 50 to revolve and the resilient ratchets 51 drive the external ring gear 31b to rotate, the external ring gear 31b will directly drive the external ring 21 to rotate and drive the external ring gear 31a to rotate, and the external ring 21 is driven by the four planetary gear wheels 24 to rotate the gear carrier 25. Since the speed of the external ring 21 is faster than the speed of the gear carrier 25, the external ring gear 31a can move first, but the driving end 42b of the control ratchets 42 is hidden, and thus the external ring gear 31a is rotated idly. Only the gear carrier 25 drives the internal ring gear 33a to rotate. Since the internal ring gear 33a is engaged with the resilient ratchets 41 of the first ratchet jacket 40 to rotate the first ratchet jacket 40, the hub 60 rotates according to the revolving of the first ratchet jacket 40 to drive the bicycle forward. In the third level of speed, the second ratchet jacket 50 rotates one round while the first ratchet jacket 40 is rotating 0.75 round.

Compared with the prior art, the hub of the invention can achieve a light weight and a small volume, and the speed change for each level can be switched stably. Further, the invention also comes with an easy manufacturing process and simplified components, so as to lower the manufacturing cost.

What is claimed is:

1. A bicycle hub speed-change assembly, comprising:

a hollow axle shaft, including a screw rod disposed on left and right sides of said hollow axle shaft, a gear wheel disposed at the middle portion of said hollow axle shaft, a bushing coupled to left and right sides of said gear wheel, a fixing pin transversally coupled to said bushing and a long groove on a surrounding wall of said axle shaft, a gear shift guiding rod engaged into said axle shaft and disposed between said two fixing pins, and a gear lever passing through a side of said axle shaft, and another side of said axle shaft being sheathed by a spring and locked by a screw bolt;

a planetary gear set, including an external ring, a plurality of internal teeth disposed around an internal wall of said external ring, two notches disposed on both left and right sides of said external ring, a gear carrier having four planetary gear wheels pivotally coupled to a surrounding position of said gear carrier, and said planetary gear wheels being engaged with said internal teeth of said external ring, and said gear carrier having two notches disposed separately on both left and right sides of said gear carrier;

a left speed-change gear wheel and a right speed-change gear wheel, each including an external ring gear, two embedding portions separately protruded from an internal side of said external ring gear, a hollow chamber disposed at an internal side of said embedding portion, a plurality of ring gears disposed on an internal sidewall of said each chamber, and said each chamber having two internal ring gears disposed therein, two engaging portions disposed at an internal side of said chamber, and a plurality of ring gears disposed on an internal wall of said chamber;

a first ratchet jacket, being a hollow body disposed at an external side on the right side of said hollow body and having a pair of ratchets and a pair of control ratchets pivotally coupled on a surrounding wall at an internal side of said hollow body, and an end of said control ratchet being a control end corresponding to a bushing at a right side of said axle shaft and another end of said control ratchet being a driving end;

a second ratchet jacket, disposed on an external side of a left speed-change gear wheel, and having a pair of ratchets and a pair of control ratchets disposed on an internal surrounding side of said second ratchet jacket, and an end of said control ratchet being a control end corresponding to a bushing on the left side of said axle shaft and another end of said control ratchet being a driving end, and said second ratchet jacket including a chain tooth disposed at an external periphery of said second ratchet jacket;

a first cover, coupled to an end of said axle shaft and having a first bearing disposed between said first cover and said first ratchet jacket, and locked to a screw rod at a side of said axle shaft by a first screw nut;

a second cover, coupled to another end of said axle shaft and having a second bearing disposed between said second cover and said second ratchet jacket and locked to said screw rod at another side of said axle shaft by a second screw nut;

a hollow hub, with its interior coupled to said axle shaft, said planetary gear set, said two speed-change gear wheels and said first ratchet jacket, and a third bearing disposed among said second ratchet jacket, said second ratchet jacket and said hub.

2. The bicycle hub speed-change assembly of claim 1, wherein said gear carrier includes four insert holes disposed on both left and right sidewalls of said gear carrier, and an insert rod disposed separately on both left and right ends of said each planetary gear wheel, and said insert rod is inserted into said insert hole.

3. The bicycle hub speed-change assembly of claim 1, wherein said two notches of said external ring of said planetary gear set are installed corresponding to each other, and said two embedding portions at an internal side of said external ring gear of said each speed-change gear wheel are installed corresponding to each other, such that said embedding portions can be embedded precisely into said notches of said external ring.

4. The bicycle hub speed-change assembly of claim 1, wherein said two notches disposed on both left and right sides of said gear carrier are disposed corresponding with each other, and said two engaging portions of said each internal ring gear are disposed corresponding to each other, such that said engaging portions can be inserted precisely into said notches.

5. The bicycle hub speed-change assembly of claim 1, wherein said first ratchet jacket includes a screw thread disposed on an external sidewall of said first ratchet jacket.

* * * * *